United States Patent [19]

Gaffan et al.

[11] Patent Number: 5,066,173
[45] Date of Patent: Nov. 19, 1991

[54] ALUMINUM PISTON WRIST PIN BORING TOOL

[75] Inventors: Charles Gaffan, Windsor; Bruno K. Schwarzpech, Harrow, both of Canada

[73] Assignee: GTE Valenite Corporation, Troy, Mich.

[21] Appl. No.: 472,913

[22] Filed: Jan. 31, 1990

[51] Int. Cl.⁵ .................................... B23B 41/12
[52] U.S. Cl. ...................... 408/59; 408/144; 408/145; 408/707; 408/224
[58] Field of Search ............. 408/223, 224, 707, 713, 408/714, 59, 144, 145, 180; 76/101.1, 108.1, 108.2, 108.4, 108.6, 11.5, DIG. 11, DIG. 12; 228/122, 185

[56] References Cited

U.S. PATENT DOCUMENTS

| 2,363,272 | 11/1944 | Taeyaerts et al. | 76/115 X |
| 2,775,149 | 12/1956 | Thomas | 408/224 X |
| 4,686,080 | 8/1987 | Hara et al. | 228/122 X |

Primary Examiner—Z. R. Bilinsky
Attorney, Agent, or Firm—Bill C. Panagos; Robert E. Walter

[57] ABSTRACT

Piston wrist pin boring tool including semi-finish and finish inserts mounted in individual cartridges adjustably secured in cartridge pockets provided in the boring bar. A carbide shank is brazed to a body provided with a cartridge pocket, and a diamond tip for the finishing insert is provided with a closely controlled flat neutral rake cutting edge supplied with coolant from central passages through the bar.

11 Claims, 2 Drawing Sheets

ALUMINUM PISTON WRIST PIN BORING TOOL

BACKGROUND OF THE INVENTION

The present invention is an improvement over a prior tool for semi-finish and finish boring piston wrist pin holes. Such prior tool comprised a "Kulite" boring bar, shrunk fit in a steel adapter, equipped with a special cartridge body having a pair of carbide inserts of square or pentagon configuration mounted for successive semi-finish and finish diameters, each with 5° positive axial rake and 5° clearance angle for in feed. A single central mounting cap screw retained the cartridge in a pocket milled in the bar with provision for fine adjustment of semi-finish and finish cutting diameters of the inserts through adjustment screws mounted at the ends of the cartridge.

BRIEF DESCRIPTION OF THE PRESENT INVENTION

The improved tool provided for semi-finish and finish boring of aluminum piston wrist pin holes comprises a steel adapter, carbide shank, steel cartridge holder body, and special cartridges respectively for holding semi-finish and finish boring inserts. A diamond tip is provided on the finish insert having a flat with radiused extremities, close control of its extension substantially parallel with the boring axis, and neutral rake, positioned relative to the semi-finish insert to remove approximately 0.08 mm of stock in the finishing cut.

The tool body is brazed to the carbide shank which provides stability for damping vibration and rigidity against deflection. A polycrystalline diamond tip insert provided with a 0.060 inch nose has been found capable of holding a ten micro finish with accurate size control of bore geometry.

DETAILED DESCRIPTION OF THE PREFERRED EMBODIMENT

Figure 1:
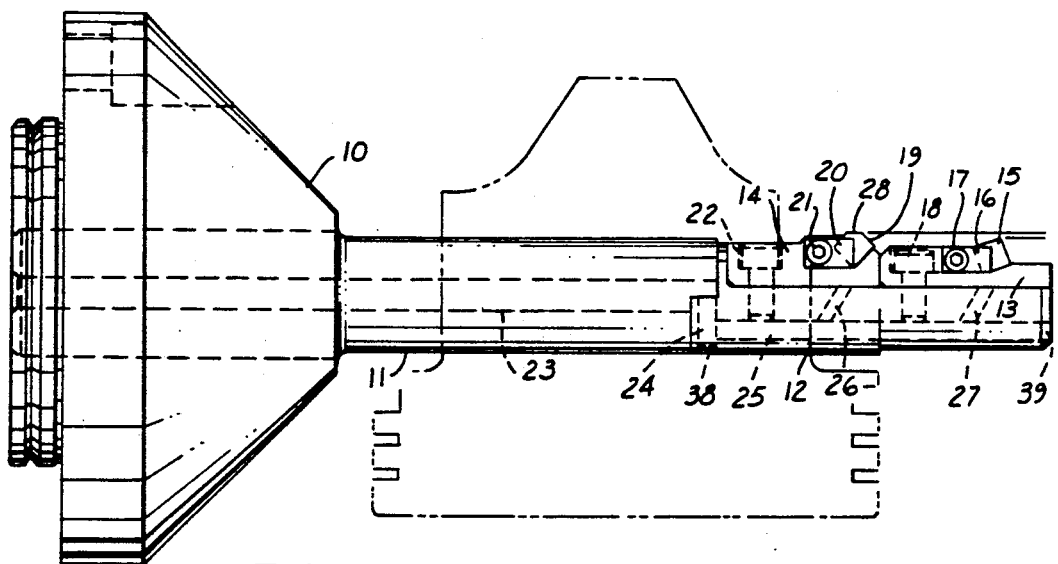
FIG. 1 is a side elevation of the tool assembly.

With reference to FIG. 1, the tool assembly of the present invention for boring a wrist pin hole in a piston, shown in phantom, comprises steel adapter 10, carbide shank 11, special cartridge holder body 12, semi-finish insert cartridge 13, and finish insert cartridge 14. Semi-finish insert 15 is held by clamp 16 and clamp screw 17, with cartridge 13 secured in body 12 by cap screw 18. Finished insert 19, in turn, is held by clamp 20 and clamp screw 21 with cartridge 14 secured in body 12 by cap screw 22. Passage 23 conducts coolant through carbide shank 11 to branch passages 24, 25, 26 and 27 to the cutting tips of inserts 15 and 19.

Figure 2:
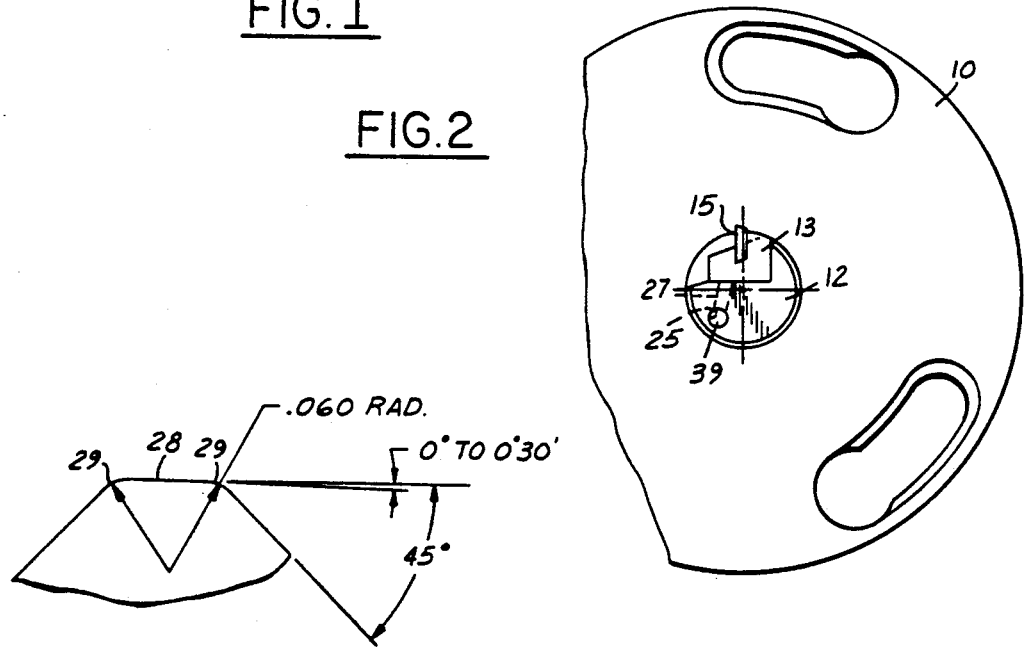
FIG. 2 is an end view of the tool shown in FIG. 1.

With reference to FIG. 2, semi-finish insert 15 is positioned ahead of center with approximately 5° negative effective radial rake. The same radial rake positioning is provided for finish insert 19. However, a positive axial rake of 5° is provided for semi-finish insert 15 while a neutral "0" axial rake is provided for finish insert 19.

Figure 3:
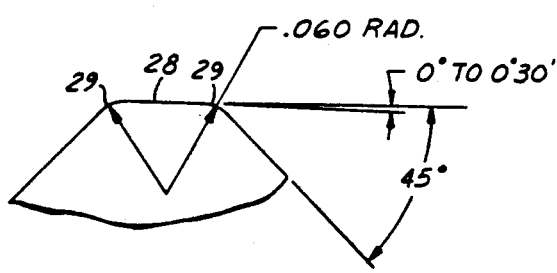
FIG. 3 is an enlarged fragmentary view of the finish insert cutting tip.

With reference to FIG. 3, illustrating a greatly enlarged cutting tip of insert 19, it will be seen that flat 28 of the cutting edge extends in a closely held range from a line parallel to the axis to a ¼° backward outward slope and is provided with a 0.060 inch corner radius 29 which has been found to hold a micro finish of approximately than 10 to 8 before and after "bearingizing".

Figure 4:
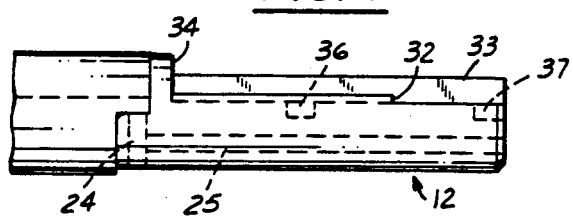
FIG. 4 is a detail side elevation of the cartridge holder body per se illustrated in FIG. 1.
Figure 5:
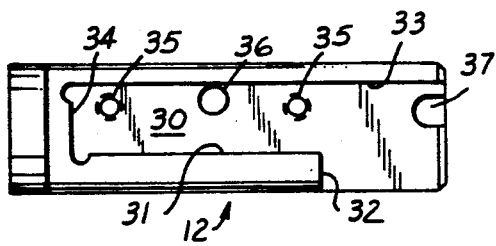
FIG. 5 is a plan view of the body shown in FIG. 4.
Figure 6:
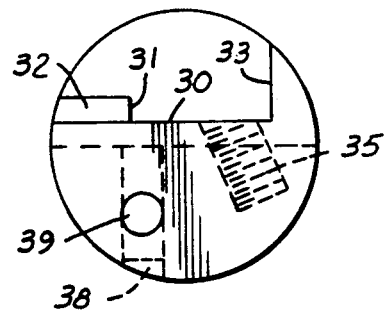
FIG. 6 is an enlarged end view of the body shown in FIG. 4.

With reference to FIGS. 4 and 5, body 12 for the special cartridges includes slot 30 extending between a shallow rail 31 terminating at end 32 and opposing wall 33 extending the full length to an end wall 34. As best shown in FIG. 5 and the enlarged view of FIG. 6, tapped holes 35 angled toward wall 33 are provided for anchoring special cartridges 13 and 14 in slot 30. Pocket 36 is provided for a carbide pad as a resistant element for adjustment of cartridge 14, hereinafter described. Similar pocket 37 for a like carbide reaction pad is provided for adjustment of special cartridge 13. Coolant hole at 34 is cleaned out after brazing body 12 to carbide shank 11 and plugged at 38 as shown in FIG. 6. Passage 25 is likewise cleaned out after brazing and plugged as shown at 39 in FIG. 6.

Figure 7:
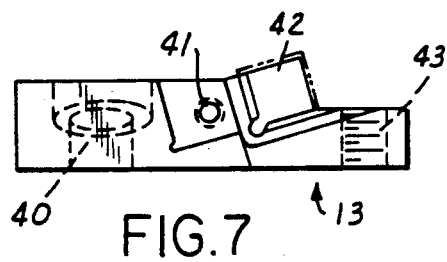
FIG. 7 is an enlarged side elevation of the special cartridge per se for the semi-finish insert illustrated in FIG. 1.

With reference to FIG. 7 illustrating special cartridge 13 per se, counterbored hole 40 is provided for cap screw 22 to secure the cartridge on slot base 30 in firm engagement with slot wall 33. Tapped hole 41 is provided for clamp screw 17 and pocket 42 is provided for carbide insert 15. Tapped hole 43 is provided for an adjustment screw, not shown, adapted to engage a carbide pad provided in pocket 37 shown in FIGS. 4 and 5.

Figure 8:
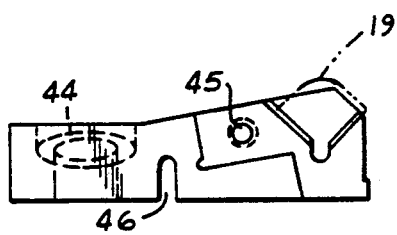
FIG. 8 is an enlarged side elevation of the special cartridge per se where the finish insert illustrated in FIG. 1.

With reference to FIG. 8 illustrating special cartridge 14 per se, tapped hole 44 is provided for securing the cartridge to body 12 and tapped hole 45 is provided for clamp screw 41. Slot 46 is provided to accommodate fine adjustment for the radial position of finish insert 19 through engagement of an adjustment screw, now shown, with the carbide pad in pocket 36 shown in FIGS. 4 and 5.

Figure 10:
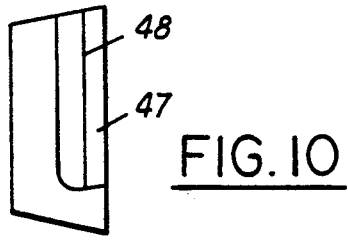
FIG. 10 is a side view of the insert shown in FIG. 9.
Figure 9:
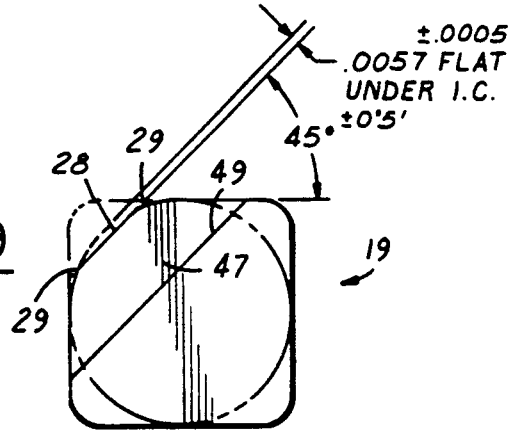
FIG. 9 is an enlarged face view of the finish insert per se shown in FIG. 1.

With reference to the enlarged views of FIGS. 9 and 10 illustrating finish insert 19 per se, polycrystalline diamond wafer 47 is bonded to shelf 48 extending across the cutting corner of the insert against diagonal shoulder 49. Flat 28 typically extends for approximately 0.10 inch with a 0.060 inch radius at either extremity 29. As described above with reference to FIG. 3, flat 28 extends substantially parallel to the tool axis with a ¼° tolerance in the direction of a clearance angle on retraction after initially advancing through the wrist pin hole. The effective wiping action of the flat cutting edge combined with the radiused corners provides a significant contributing factor to achieving a 10 micro finish bore surface, such flat being rendered durable against rapid dulling by the polycrystalline diamond cutting edge. In addition, the neutral axial rake, combined with the flat 28 extending parallel to the boring axis provides a linear wiping action in the true nominal finished bore surface.

In preparation for assembly, carbide shank 11 and cartridge mounting body 12 are initially machined oversize with grinding stock and brazed together as shown in FIG. 1. In next preparing adapter 10 and carbide shank 11 for shrink fit assembly, they are accurately bored and ground respectively to a 0.002 inch diameter interference fit at room temperature followed by heating the adapter and, if necessary, cooling the shank to facilitate a light press fit assembly. The cartridge pockets are next machined, the carbide shank and body turned, the coolant holes drilled, and the carbide shank and body finally ground to a gage diameter, e.g., 0.8800 inch plus or minus 0.0002 inch.

In summary, the present improvement combines semi-finish and finish bore inserts with the finish insert having a diamond tip with a closely controlled neutral rake finishing flat. In boring a typical semi-finish bore diameter of 0.907/0.908 inch and finish bore diameter of 0.9122/0.9126 inch with coolant applied, recommended feed and speed are:

| R.P.M.: | 3450 |
| --- | --- |
| S.F.P.M.: | 824 |
| I.P.M.: | 15 inch in; 15 inch out |
| Cutting time: | 12.08 seconds in; 12.08 seconds out for a five inch piston diameter |

The carbide shank with shrink fit in the adapter and brazed to the cartridge mounting body provides relatively heavy stability against vibration and rigidity against deflection.

We claim:

1. An aluminum wrist pin boring tool having an axis of rotation, comprising:
   a. an adapter;
   b. a shank attached to said adapter and concentric therewith, said shank passing through said adapter and having a passage extending longitudinally through the length of said shank;
   c. a cartridge means for mounting semi-finish and finish boring inserts characterized by said finish inset having a cutting tip with a linear flat cutting edge, said cartridge means being attached concentrically with said shank and having a series of interconnecting branch passages, said branch of passages in communication with said shank passage and open at the cartridges to allow flow of coolant through to the boring inserts, said semi-finish insert positioned ahead of center with approximately a 5° negative effective radial rake and a 5° positive axial rake, and said finish insert having approximately a 5° negative effective radial rake and a neutral "0" axial rake, said finish insert further characterized in that said flat cutting edge extends in a closely held range from a line parallel to said axis to a ½° backward outward slope.

2. Tool of claim 1 wherein said cutting edge extends substantially parallel to the hole axis.

3. Tool of claim 1 wherein said flat cutting edge terminates at radiused extremities.

4. Tool of claim 1 wherein said flat cutting edge terminates at extremities having approximately 0.060 inch radius.

5. Tool of claim 4 wherein said insert is provided with a diamond cutting tip.

6. Tool of claim 4 wherein said insert is provided with a diamond cutting tip comprising a polycrystalline wafer bonded to an insert substrate.

7. Tool of claim 4 wherein said shank comprises solid carbide brazed to said body.

8. Tool of claim 7 wherein said adapter is steel having a shrink fit assembly to said carbide shank.

9. Tool of claim 8 wherein said body is provided with cartridge pocket means mounting individual semi-finish insert cartridges.

10. Tool of claim 1 wherein said semi-finish insert is mounted with 15° clearance angle.

11. Tool of claim 1 wherein said finish insert is provided with an 11° positive side wall.

* * * * *